Dec. 17, 1929.  G. C. CARHART  1,739,946
TRANSMISSION MECHANISM AND BRAKE
Filed Nov. 19, 1924   3 Sheets-Sheet 1

Dec. 17, 1929.  G. C. CARHART  1,739,946
TRANSMISSION MECHANISM AND BRAKE
Filed Nov. 19, 1924  3 Sheets-Sheet 3

George C. Carhart, INVENTOR.

BY
Parsons & Bodell, ATTORNEYS.

Patented Dec. 17, 1929

1,739,946

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

TRANSMISSION MECHANISM AND BRAKE

Application filed November 19, 1924. Serial No. 750,946.

This invention relates to transmission mechanism including a clutch operable to connect and disconnect the driven shaft and the propeller shaft of the vehicle from the engine and the gearing at certain times as during gear shifting operations and has for its object a particularly simple and efficient brake mechanism operable when the propeller shaft is disconnected, particularly to retard the rotation of the gears of the change speed gearing preliminary to gear shifting operations so that the gear shifting is made easy and can be accomplished by unskilled operators or so that the personal equation is largely eliminated from the gear shifting operation.

The invention consists in the novel features and in the combinations and constructions hereinafter set forth and claimed.

In describing this invention, reference is had to the accompanying drawings in which like characters designate corresponding parts in all of the views.

Figure 1:
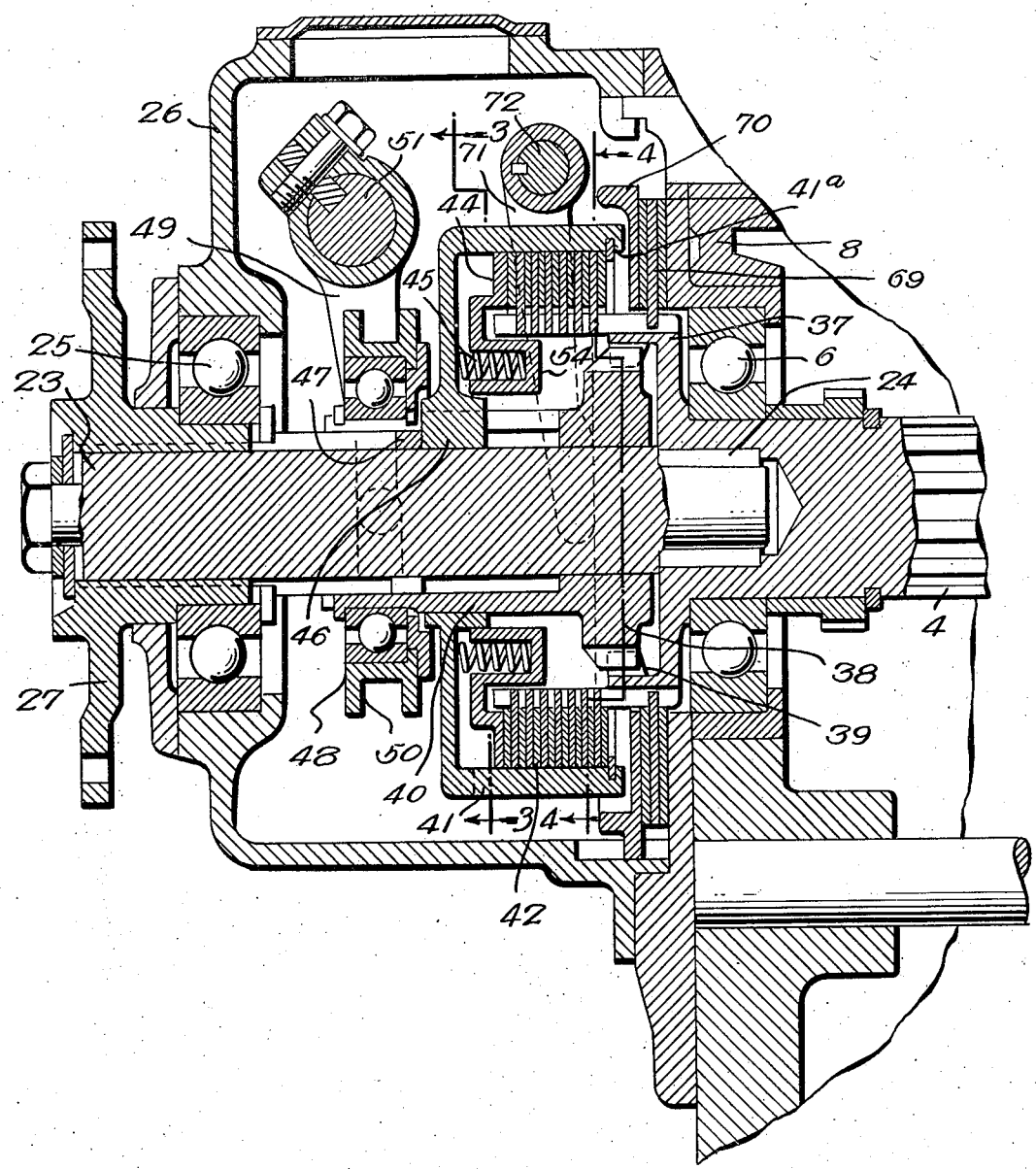
Figure 1 is a fragmentary sectional view of a transmission mechanism provided with one form of my brake mechanism.
Figure 2:
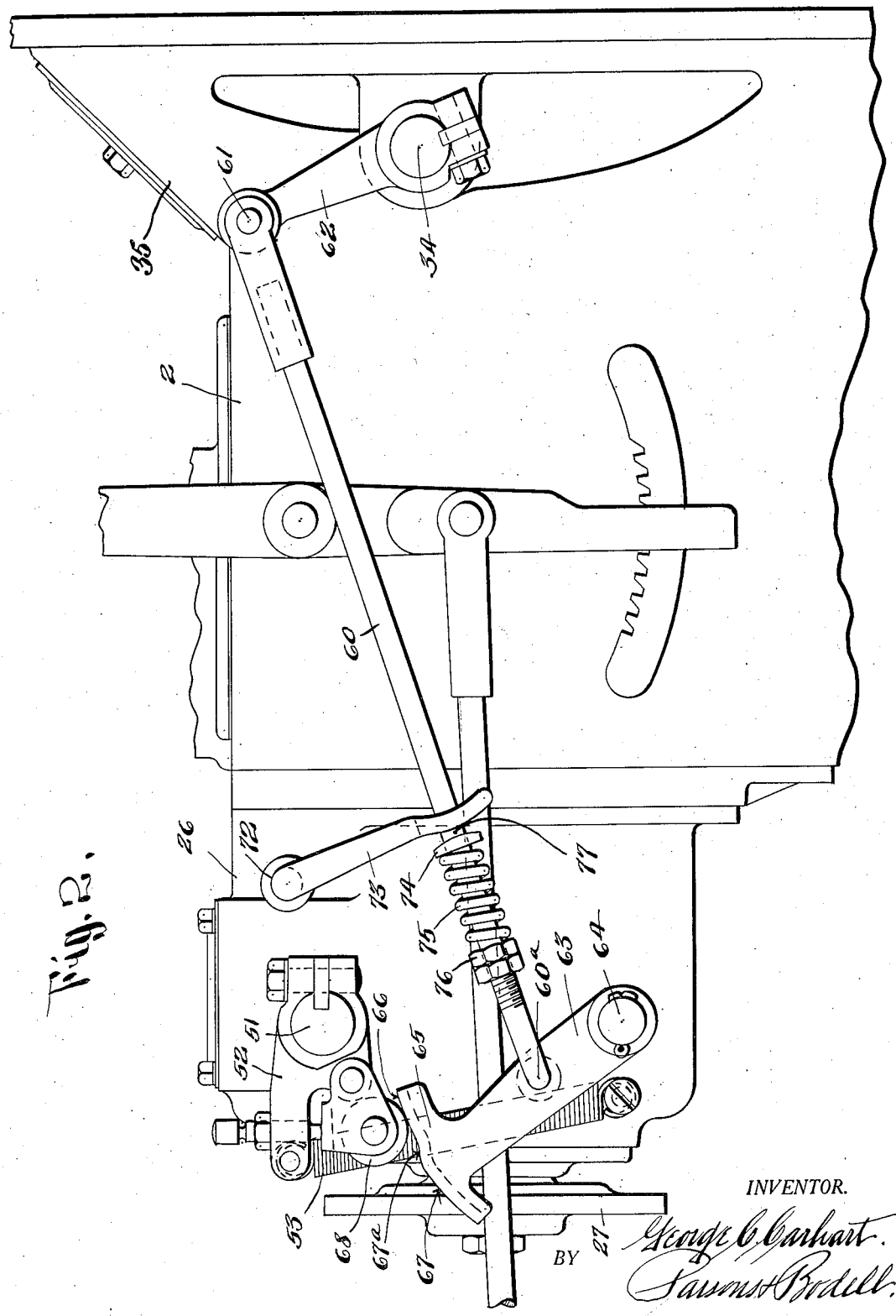
Figure 2 is a side elevation of a transmission mechanism embodying my invention and the parts seen in Figure 1, parts being omitted, the connection between the operating means for the main and auxiliary clutches and between the operating means for the brake mechanism and that for the clutches being shown.
Figure 3:
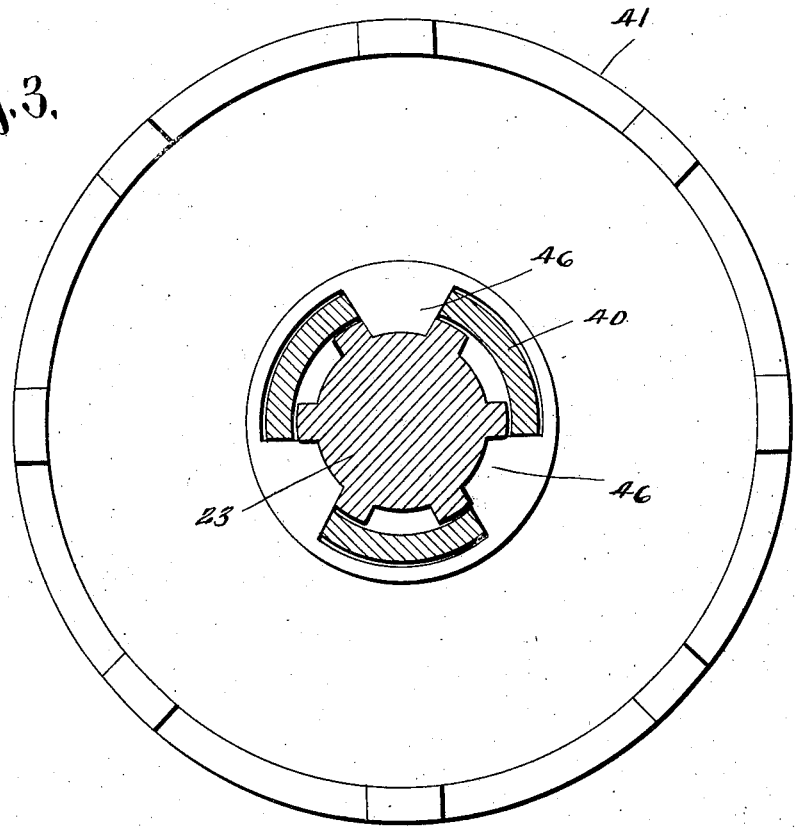
Figure 4:
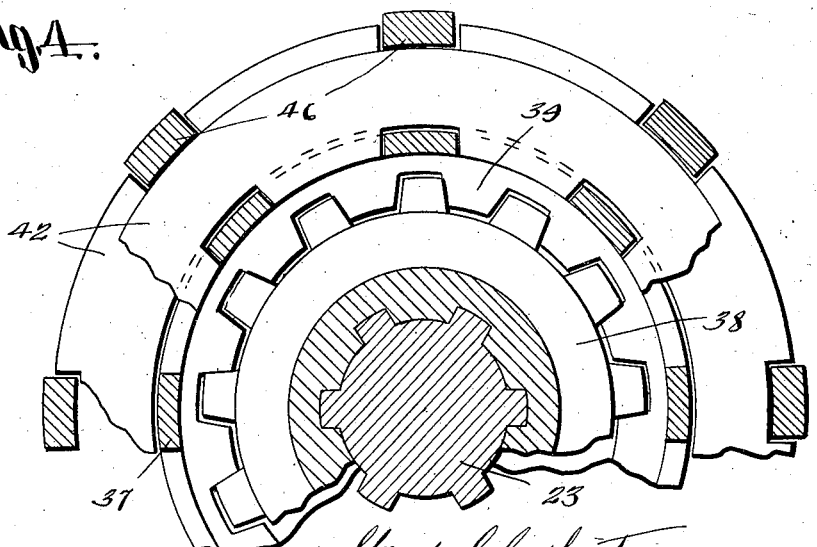

Figures 3 and 4 are sectional views taken respectively on lines 3—3 and 4—4, Figure 1.

This invention comprises generally a brake mechanism arranged to retard the rotation of the gears and rotatable parts of a transmission gearing preliminary to the gear shifting operation.

The invention comprises an auxiliary or rear clutch between the driven shaft of a transmission gearing and the propeller shaft driver of the transmission gearing to retard the rotation of said shaft, and hence retard the rotation of the gears of the gearing when the brake is applied, and operating means for the brake, and also preferably connections between the brake operating means and the means for operating the main clutch of the transmission mechanism, that is the clutch connecting the gearing and the engine of the vehicle in which the gearing is mounted.

2 designates the transmission gear casing or box.

4 is the driven shaft of the transmission gearing, this being journalled in a bearing 6 provided in the rear wall 8 of the casing or box 2.

9 is the counter-shaft mounted in the casing.

The gears of the gearing are shifted in any well known manner as by a selecting and shifting lever.

23 is what for convenience is called a propeller shaft driver, it being axially alined with the shaft 4 and having a pilot bearing at 24 therein. This shaft 23 is mounted in a suitable bearing 25 in a casing 26 secured in any suitable manner to the rear end of the gear casing 2 or formed as a part thereof. The propeller shaft driver is connected to a propeller or other shaft usually through a universal joint, one section of which is designated 27.

The main clutch which is located in the clutch housing 35 is operated in any well known manner from a rock shaft 34 journalled in the clutch housing 35, the usual clutch pedal being mounted on this clutch shaft 34.

The auxiliary or rear clutch may also be of any suitable form, size and construction and includes a section 37 mounted on the rear end of the driven shaft 4 of the transmission gearing outside of the gear casing 2 and within the casing 26, and a section or sections rotatable with the propeller shaft driver 23. The auxiliary clutch here shown is a compound clutch including positively engaged sections and frictionally engaged sections.

38 designates a toothed section or head slidable axially of the propeller shaft driver 23 into and out of engagement with internal teeth 39 provided on the clutch section 37, this clutch section 38 being splined to the propeller shaft driver 23 and having a rearwardly extending sleeve 40 for connection to the operating mechanism therefor, this sleeve being slotted for a purpose hereinafter set forth.

The auxiliary clutch also, in this embodiment of my invention, includes frictionally engaged sections including an outer drum 41 mounted on the propeller shaft driver 23 to rotate therewith and embracing but spaced apart therefrom, an inner drum associated with the section 37, sets of interleaved disks 42 slidably interleaved respectively with the outer drum 41 and the inner drum associated with the clutch section 37, and a pressure plate 44 rotatable with the drum 41 and pressed by springs 45 to compress the disks 42 toward a suitable fixed abutment 41$^a$. The hub of the drum 41 is formed with internal projections 46 extending through the slots of the sleeve 40 of the clutch head or section 38 and into grooves or splines in the propeller shaft driver 23. The drum is held from endwise movement by a suitable shoulder or collar 47 on the propeller shaft driver 23.

The auxiliary clutch is operated by a throw-out mechanism including a throw-out collar 48 on the rear end of the sleeve 40 of the positive clutch section 38, and a shifter arm 49 working in the annular groove 50 in the collar 48, this arm being mounted on a rock shaft 51 journalled in the case 26 and extending to the outside thereof and having an operating arm 52 at its outer end which is actuated in such direction as to engage the clutch by a spring 53. When this shaft 51 is actuated against the action of the spring 53, the toothed or positive clutch section 38 is first withdrawn out of engagement with the teeth of the clutch section 37 and thereafter this clutch section 38 engages the pressure ring 44 at 54 so that further movement of the clutch section 38 releases the disks 42. Hence the propeller shaft driver 23 is disengaged from the transmission shaft 4, the positive clutch sections being first disengaged and thereafter the friction clutch sections disengaged.

During the re-engagement of the auxiliary clutch, the friction clutch sections are engaged in advance of the positive clutch sections 37 and 38.

The drums of the friction clutch section, that is, the annular wall of the drum 41 and the corresponding wall of the clutch section 37 are in the form of a cage, that is, each is made up of parallel bars as shown in Figures 3 and 4.

The connections between the operating means for the main clutch and the operating means for the auxiliary clutch comprise a rod 60 connected at its front end at 61 to a rock arm 62 mounted on the clutch pedal shaft 34 and connected at its rear end at 60$^a$ to a rock arm 63 pivoted on a stud 64 projecting from one side of the case 26, this rock arm having a cam 65 thereon coacting with the cam follower on the rock arm 52, which actuates the throw-out shaft 51 for the rear clutch. This cam 65 has a low portion 66, a high portion 67 and a lift portion 67$^a$ between them, and the low portion normally coacts with the roller or follower 68 associated with the rock arm 52 and the roller is normally spaced apart from the lift portion 67$^a$ of the cam so that upon depression of the clutch pedal, the main clutch is first disengaged or partly disengaged before the lift portion of the cam actuates the roller 68 to disengage the rear clutch or the positive sections 37 and 38 thereof, so that the main clutch is first disengaged thereafter the positive clutch section of the rear clutch disengaged and then the friction clutch section is disengaged. In other words, the main clutch is disengaged in advance of the auxiliary clutch and the auxiliary clutch re-engaged in advance of the main clutch.

The construction of the clutches, the operating means therefor and the connections between them per se form no part of this invention.

This invention relates to a brake for retarding the rotation of the gears of the transmission gear in combination with such main and auxiliary clutches.

In the illustrated embodiment of my invention, the brake is associated with the clutch section 37 or rather includes a portion or section associated with the clutch section 37. As here shown, this brake includes a brake disk 69 interlocked with the inner drum or with the section 37 and located adjacent the rear face of the wall 8 of the gear casing 2 in which the shaft 4 is journalled, the friction disk having friction faces or disks on opposite sides thereof, and a pressure member or ring 70 slidable on the inner drum 37, the friction disk 69 being interposed between the pressure ring 70 and the rear face of the wall 8 of the gear casing.

The pressure ring or movable abutment 70 is operated by rock arms 71 mounted on a rock shaft 72 journalled in the casing 26, these arms pressing against the pressure ring at their free ends. The rock shaft 72 is operated by some part operated preliminary to bringing two parts, gears or clutches, of the transmission gearing into mesh or engagement, as by the gear shifting lever or the clutch pedal. As here illustrated, the shaft 72 is actuated by the connections between the main and auxiliary clutch operating means, that is, the rod 60 and as here shown the brake connections comprise a rock arm 73 mounted on the rock shaft 72 outside of the case 26 and coacting with or arranged in the path of a shoulder 74 on the rod 60. This shoulder 74 is preferably spring pressed by a spring 75 encircling the rod and thrusting at one end against adjustable shoulders or nuts 76 on the rod 60 and at the other end against the head or shoulder 74.

There is preferably a lost motion at 77 between the shoulder 74 and the rock arm 73.

When the main clutch pedal is depressed, the main and auxiliary clutches are partially released while the lost motion at 77 is being taken up. Thereafter the shoulder 74 engages the rock arm 73 and actuates the same to apply the brake, that is, it actuates the pressure ring 70, the motion being yieldingly applied through the spring 75 which may be considered a brake spring.

In the operation of the entire mechanism, the clutch pedal is first depressed to first disengage or partly disengage the main clutch and thereafter to disengage the auxiliary clutch and thirdly to apply the brake, this all being done in proper sequence without any skill on the part of the operator. When the brake is applied the rotation of the parts of the transmission gearing is retarded or stopped so that the gear shifting can be done merely by manipulating the selecting and shifting lever and without calling for any skill on the part of the operator. After the gear shifting is accomplished and the clutch pedal is released in the usual manner, the brake or pressure ring 70 thereof is first released and thereafter the transmission gears are driven through the friction portion of the auxiliary clutch permitting them to overcome their inertia and to get in motion preparatory to the engagement of the positive clutch sections 37 and 38, and thereafter the main clutch is engaged and at the time the main clutch is engaged, the gears of the transmission gearing are being driven by the momentum of the vehicle and in synchronism with the speed of the vehicle and are not started in motion by the engagement of the main clutch.

Owing to this brake mechanism in combination with the main and auxiliary clutches, gear shifting operations are rendered particularly easy even to the most unskilled and inexperienced operators.

I claim:

1. A motion transmitting mechanism comprising the driven shaft of a change speed gearing and a propeller shaft driver in line with the driven shaft, a clutch connecting the driven shaft of the gearing and the propeller shaft driver including a section mounted on the said driven shaft and a section mounted on the propeller shaft driver, the latter section being normally in, and shiftable out of clutching engagement, a brake including a member associated with the clutch section mounted on the driven shaft of the gearing and rotatable therewith and a movable abutment coacting with the brake member, means for shifting the shiftable clutch section out of clutching position, and means operated by the former means for acting on the movable abutment to actuate the same to engage the brake member during the throwing "out" of the shiftable clutch section.

2. A motion transmitting mechanism comprising the driven shaft of a change speed gearing and a propeller shaft driver in line with the driven shaft, a clutch connecting the driven shaft of the gearing and the propeller shaft driver including a section including an inner drum mounted on the said driven shaft and a section mounted on the propeller shaft driver including an outer drum spaced apart from the inner drum, interleaved friction disks between the drums and an axially shiftable spring pressed pressure member to normally hold the disks engaged, a brake including a disk interlocked with the inner drum, fixed and movable abutments on opposite sides of the brake disk, means for shifting the pressure member out of clutching position and means operated by the former means for acting on the movable brake abutment to actuate the same during the throwing "out" of the pressure member.

3. A motor transmitting mechanism comprising the driven shaft of a change speed gearing and a propeller shaft driver in line with the driven shaft, and a casing for the gearing including a wall having a bearing for the rear end of the driven shaft, a clutch connecting the driven shaft of the gearing and the propeller shaft driver including a section mounted on the driven shaft and extending beyond said wall and a shiftable member mounted on the propeller shaft driver, a brake including a member located adjacent said wall and associated with the clutch section mounted on the driven shaft of the gearing and rotatable therewith, said wall forming a fixed abutment for the brake member, an abutment movable toward and from said wall, the brake member being interposed between the abutments, means for shifting the shiftable clutch member out of clutching position, and means operated by the former means and acting on the movable abutment to actuate it during the throwing "out" of the shiftable clutch section.

4. A motion transmitting mechanism comprising the driven shaft of a change speed gearing and a propeller shaft driver in line with the driven shaft, and a casing including a wall having a bearing for the rear end of the driven shaft, a clutch connecting the driven shaft of the gearing and the propeller shaft driver comprising an inner drum mounted on the rear end of the driven shaft and extending beyond said wall and an outer drum mounted on and rotatable with the propeller shaft driver, a section mounted on the propeller shaft driver, interleaved disks between the drums, a spring-pressed, axially shiftable pressure member normally holding the disks engaged, a brake disk mounted on the inner drum adjacent said wall, said wall forming a fixed abutment for the brake disk, a movable abutment between the clutch disks and the brake disk and movable to compress the brake disk toward said wall, means for shifting the pressure member, and means operated by the former means and acting on the movable abutment to actuate the same to compress the brake disk against the fixed abutment during the throwing "out" of the pressure member, the inner drum also being formed with internal clutch teeth and the clutch section mounted on the propeller shaft driver also including a toothed clutch head movable into and out of engagement with the clutch teeth and the operating means for the pressure member also operating to shift the clutch head into and out of clutching position.

In testimony whereof, I have hereunto signed my name, at Syracuse, in the county of Onondaga and State of New York, this 8th day of November, 1924.

GEORGE C. CARHART.